United States Patent
Dietrich, Sr. et al.

(10) Patent No.: US 6,896,068 B2
(45) Date of Patent: May 24, 2005

(54) TILLAGE IMPLEMENT WITH INDEXED HARROW

(75) Inventors: William J. Dietrich, Sr., Goodfield, IL (US); Dean A. Knobloch, Congerville, IL (US)

(73) Assignee: CNH America LLC, Racine, WI (US)

(*) Notice: Subject to any disclaimer, the term of this patent is extended or adjusted under 35 U.S.C. 154(b) by 92 days.

(21) Appl. No.: 09/972,312

(22) Filed: Oct. 5, 2001

(65) Prior Publication Data

US 2002/0144827 A1 Oct. 10, 2002

Related U.S. Application Data

(60) Provisional application No. 60/281,638, filed on Apr. 5, 2001.

(51) Int. Cl.$^7$ .................................................. A01B 5/00
(52) U.S. Cl. ....................... 172/145; 172/149; 172/176; 172/142
(58) Field of Search ................................ 172/142, 145, 172/146, 149, 151, 176, 177, 175; 111/52

(56) References Cited

U.S. PATENT DOCUMENTS

| | | | |
|---|---|---|---|
| 68,110 A | 8/1867 | Prutzman | |
| 918,445 A | 4/1909 | Gundholm | |
| 1,055,529 A | 3/1913 | Headley | |
| 1,447,862 A | 3/1923 | Jones | |
| 1,583,776 A | 5/1926 | Brownson | |
| 1,930,850 A | * 10/1933 | Colca | |
| 2,758,531 A | * 8/1956 | Siems | |
| 3,225,839 A | * 12/1965 | Petitt | |
| 3,314,485 A | * 4/1967 | Godbersen | |
| 3,322,203 A | * 5/1967 | Johnson | |
| 3,796,269 A | 3/1974 | Carlucci | 172/149 |
| 3,821,989 A | 7/1974 | Van Der Lely et al. | 172/59 |
| 3,977,476 A | 8/1976 | Van der Lely | 172/51 |
| 4,088,083 A | * 5/1978 | Dail, Jr. et al. | |
| 4,180,005 A | 12/1979 | Zumbahlen | 111/52 |
| 4,212,254 A | 7/1980 | Zambahlen | 111/52 |
| 4,245,706 A | 1/1981 | Dietrich, Sr. | 172/180 |
| 4,304,306 A | 12/1981 | Maust, Jr. et al. | 172/643 |
| 4,361,191 A | 11/1982 | Landoll et al. | 172/146 |
| 4,381,823 A | 5/1983 | Dietrich, Sr. | 172/155 |
| 4,423,787 A | * 1/1984 | Steinberg | |
| 4,446,925 A | 5/1984 | Vachon | 172/142 |
| 4,542,793 A | * 9/1985 | Dietrich, Sr. | 172/180 |
| 4,561,504 A | 12/1985 | Andersen | 172/142 |
| 4,615,396 A | 10/1986 | Arnold | 172/138 |
| 5,323,720 A | 6/1994 | Moore, Jr. | 111/8 |
| 5,474,135 A | 12/1995 | Schlagel | 172/151 |
| 5,622,227 A | 4/1997 | McDonald | 172/146 |
| 5,769,170 A | * 6/1998 | Skjaeveland | |
| 5,988,294 A | * 11/1999 | Hubscher | 172/453 |
| 6,612,381 B2 | * 9/2003 | Powell et al. | 172/586 |
| 6,626,246 B2 | * 9/2003 | Gerber et al. | 172/142 |

FOREIGN PATENT DOCUMENTS

| DK | 79461 | * 1/1953 | 172/142 |
|---|---|---|---|

OTHER PUBLICATIONS

Imperial 2700 Series Mulchers Brochure, Oct. 1979, 8 pages.*
Glencoe Soil Finisher brochure, 1989, 6 pages.*
Krause Landsman brochure, Sep. 1989, 6 pages.*

* cited by examiner

Primary Examiner—Victor Batson
(74) Attorney, Agent, or Firm—Brant T. Maurer; Rebecca Henkel

(57) ABSTRACT

A tillage implement includes a hitch adapted for connection to a prime mover. A cultivator section is attached to the hitch. The cultivator section includes a plurality of transversely spaced cultivator members. A tine harrow assembly is connected to the cultivator section in a trailing relationship thereto. The tine harrow assembly includes at least two transversely oriented rows of transversely spaced tines. A first row of tines are adjacent to the cultivator section having the tines arranged such that one of the tines is positioned along a line of travel offset laterally from a line of travel of each the cultivator members to engage soil positioned in a mound to opposing sides of the cultivator members.

12 Claims, 13 Drawing Sheets

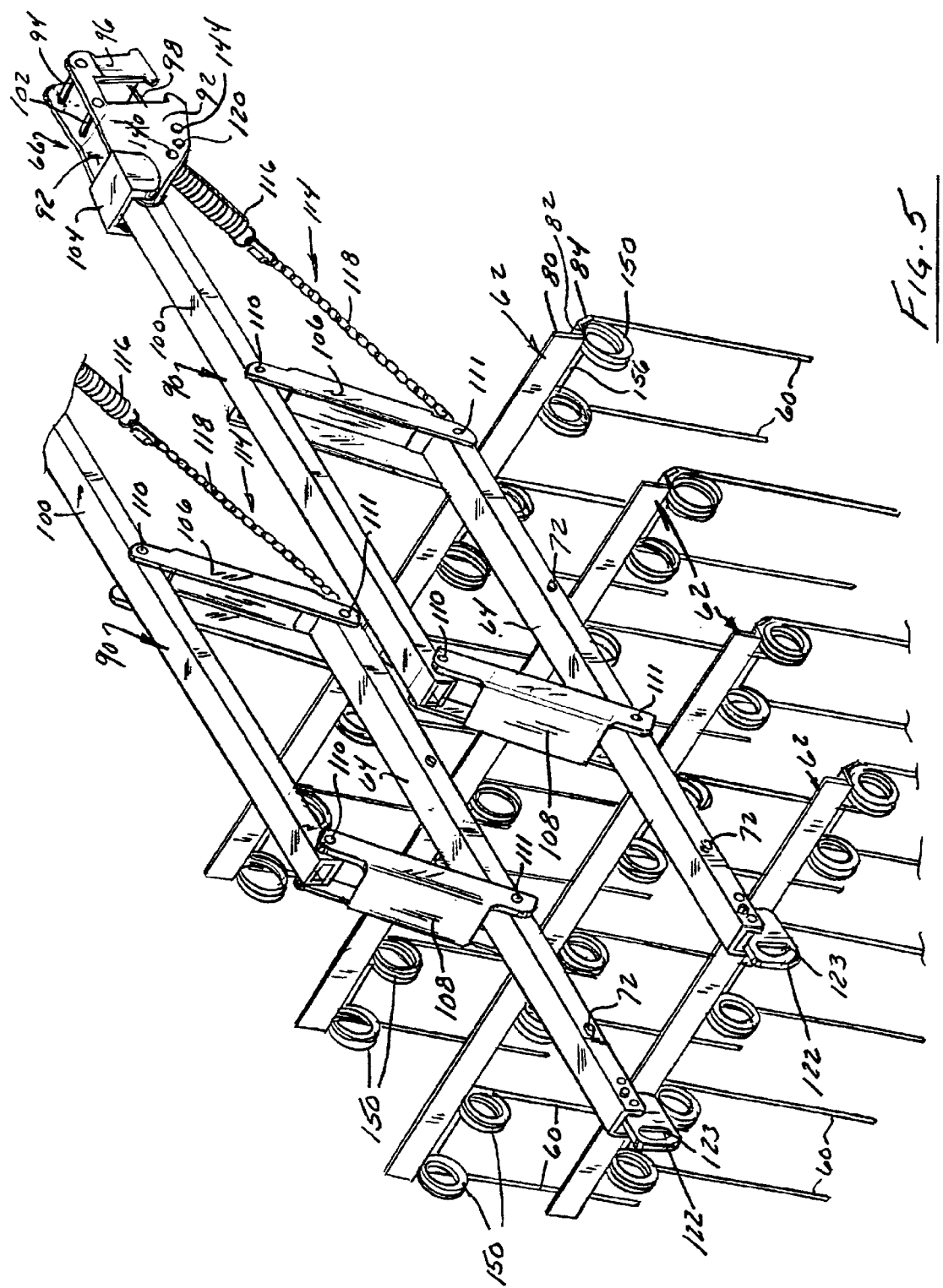

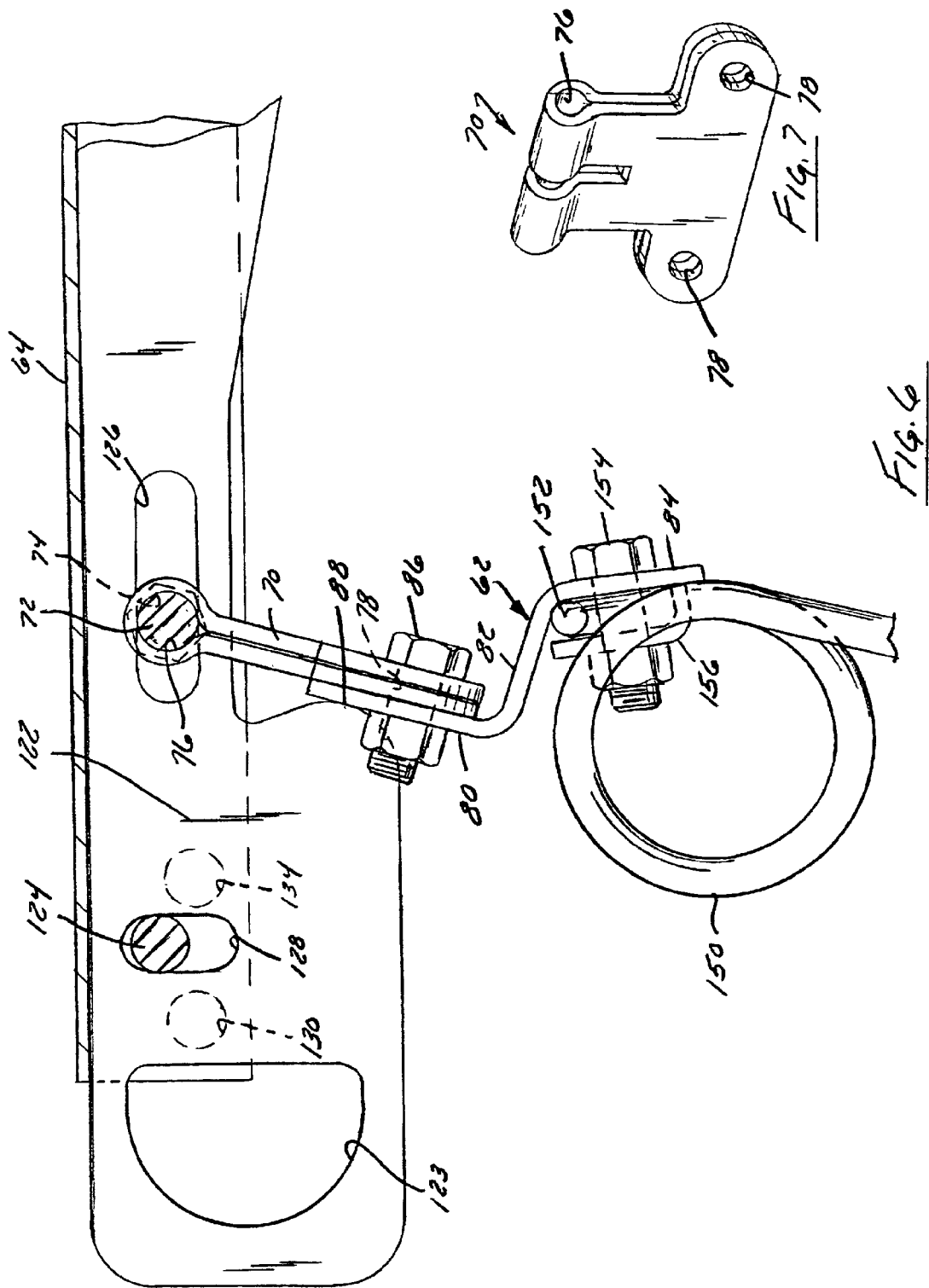

TILLAGE IMPLEMENT WITH INDEXED HARROW

This appl. claims benefit of 60/281,638, filed Apr. 5, 2001.

FIELD OF INVENTION

The invention relates to soil working implements and, more particularly, relates to a soil working implement having a cultivator and one or more tine harrows sections articulated to the cultivator in a trailing relationship relative thereto. The invention additionally relates to a soil working implement of the above-identified type having tines indexed to sweeps of the cultivator.

BACKGROUND OF THE INVENTION

A wide variety of tillage implements are used to prepare soil for planting. Some such implements include two or more sections articulated to one another so as to perform multiple functions as they are pulled through fields by a single tractor or other prime mover. One such implement is a cultivator/harrow, which is capable of simultaneously tilling soil and leveling the tilled soil in preparation for planting. This implement includes a cultivator that is towed by a tractor or other prime mover, and a unitary or sectional tine harrow that is towed by the cultivator.

The cultivator includes a plurality of cultivator members or "sweeps" (sometimes known as shanks or chisel plows) that are suspended from a frame and that rip into the soil as the machine is pulled across the ground to till the soil. The sweeps are arranged in transversely extending rows. The sweeps of each row are transversely staggered relative to the sweeps of the adjacent rows. In use, each successive row of sweeps tills part of a strip of soil left untilled by the preceding row. The last row of sweeps tills the last untilled strip of the swath, leaving ridges between the sweeps that are flanked by valleys directly behind the sweeps.

The harrow is designed to level the tilled soil sufficiently to produce a seedbed that is as level as possible and that is relatively clod free. A clod free, level seedbed formed from soil of relatively small particle size is desirable because it facilitates planting to a uniform depth and, accordingly, promotes uniform germination and uniform emergence. The typical harrow includes a plurality of grounded-engaging tines that penetrate the soil tilled by the cultivator. Multiple harrow sections are often provided, each of which spans a proportionate part of the transverse width of the swath tilled by cultivator. The tines are typically arranged in longitudinally extending, transversely spaced rows. They are intended to redirect soil from ridges or windrows left by the cultivator sweeps into the adjacent valleys, hence leveling the tilled surface. The tines, and/or related equipment such as rotating baskets, also firm the soil and break up clods.

Many harrows and harrow sections are designed for use strictly as an attachment to a cultivator. The tines in adjacent rows typically are indexed relative to one another to provide nearly complete coverage of the swath tilled by the cultivator. However, the tines are not indexed with respect to the cultivator sweeps. As a result, some of the tines of the typical harrow are not properly positioned to engage the ridges left by the cultivator sweeps in an optimal sequence. Harrows of this type, therefore, do not level the ridges left by the cultivator sweeps as well as may be desired. In fact, some of the harrow tines may be positioned so as to direct soil towards the ridges left by the cultivator sweeps rather than away from them, hence defeating the purpose of the harrow.

These problems are compounded by modern agricultural machinery, which operates at travel speeds of up to 9 mph. A cultivator operating at these speeds leaves deeper ridges than earlier cultivators operated at lower speeds. Known tine placement configurations, even if properly indexed relative to one another produce uniform ridges, still produce ridges that are too large to permit planting as the next operation.

Some of the problems mentioned above can be alleviated by replacing the last row(s) of tines with rotary wheels or crumbler wheels that are designed to roll behind the rows of tines and flatten the ridges left by the tines. However, current wheels are not sufficiently even or level relative to the seedbed left by the tines to adequately perform these functions, nor do they reduce soil clod size sufficiently.

The need therefore has arisen to provide a tine harrow that is configured to be towed by a cultivator and that has tines that are properly indexed, both relative to one another and to the cultivator sweeps, to maximize the leveling capability of the harrow.

SUMMARY OF THE INVENTION

It is an object of the invention to avoid the disadvantages of the prior art by providing tines that are properly indexed, both relative to one another and to the cultivator sweeps, to maximize the leveling capability of the harrow.

In accordance with the first embodiment of this invention, there is provided a tillage implement including a hitch adapted for connection to a prime mover, a cultivator section attached to the hitch, and a tine harrow assembly attached to the cultivator section. The cultivator section includes a plurality of transversely spaced cultivator members. The tine harrow assembly is attached to the cultivator section in a trailing relationship thereto. The tine harrow assembly includes at least two transversely oriented rows of transversely spaced tines. The first row of tines is adjacent to the cultivator section having the tines arranged such that one of the tines is positioned along a line of travel offset laterally from a line of travel of each of the cultivator members to engage soil positioned in a mound to opposing sides of the cultivator member.

The tillage implement may include a second row of tines trailing the first row of tines mounted thereon at positions that are offset laterally from the tines of the first row of tines.

The first row of tines may have only two tines positioned along a line of travel between adjacent lines of travel of the cultivators.

The tine harrow assembly may include four transversely oriented rows of tines. The third row of tines may include tines mounted thereon at positions laterally offset from the tines of the second row of tines.

The tines mounted on the third row may be offset laterally from the tines of both the first and second rows of tines.

The fourth row of tines may be offset laterally from the tines of the third row of tines.

The tillage implement may include a rotary reel positioned rearwardly from the tine harrow assembly in a trailing relationship thereto.

In accordance with a second embodiment of the invention, a method of tilling soil with a tillage implement which includes a cultivator section and a trailing tine harrow assembly; the cultivator section includes a plurality of laterally spaced cultivator members, tine harrow assembly includes a plurality of tines arranged in at least two transversely extending rows of tines, where the method includes the steps of passing the cultivator members through the soil to create a mound of soil positioned laterally to each lateral side of each the cultivator member and engaging the mound of soil created by the cultivator member with a single tine in a first transverse row of the tines oriented along a line of travel offset laterally of a line of travel corresponding to the respective cultivator member.

These and other features and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 5 is a perspective view of the harrow section of FIG. 4, viewed from above the harrow section;

FIG. 6 is a side elevation view of a portion of the harrow section of FIGS. 4 and 5, including a tine bar, a hinge, a portion of one of the tines, a portion of a tine slide, and a portion of one of the support arms;

FIG. 7 is a perspective view of the hinge of FIG. 6;

DETAILED DESCRIPTION OF PREFERRED EMBODIMENTS

Figure 1:
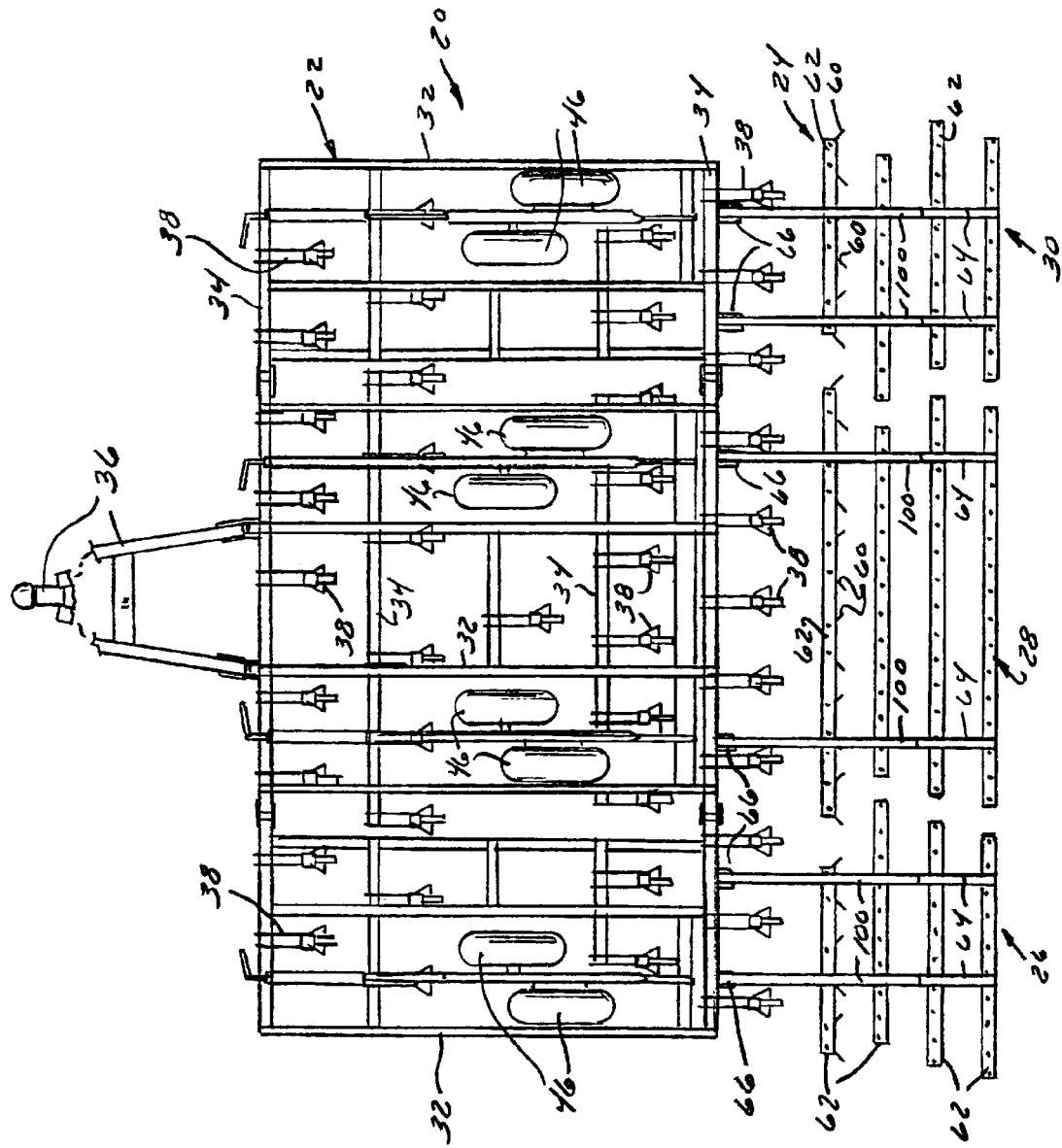
FIG. 1 is a top plan view of a soil working implement constructed in accordance with a first preferred embodiment of the invention.
Figure 2:
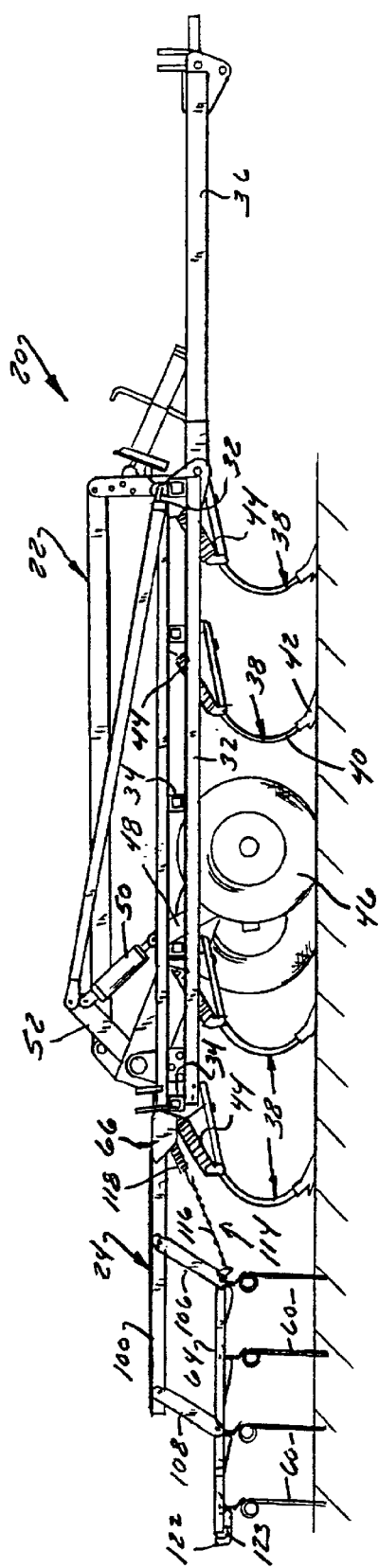
FIG. 2 is a side elevation view of the implement of FIG. 1.

Referring now to the drawings and initially to FIGS. 1 and 2 in particular, a ground working implement 20 constructed in accordance with a first preferred embodiment of the present invention includes a cultivator 22 and a harrow 24 articulated to one another in an end-to-end fashion. The cultivator 22 is configured to be towed by a tractor or other prime mover so as to till the soil over which the implement 20 travels. The harrow 24 is towed by the cultivator 22 and is configured to level windrows or ridges left by the cultivator 22. The harrow 24 preferably takes the form of a plurality (3 in the illustrated embodiment) of harrow sections 26, 28, 30 independently articulated to the back of the cultivator 22. The center harrow section 28 of the illustrated embodiment is wider than the two flanking end sections 26 and 30. However, different numbers of harrow sections of different relative widths, or even a single harrow section spanning the width of the swath tilled by the cultivator 22, could be provided if desired.

Figure 3:
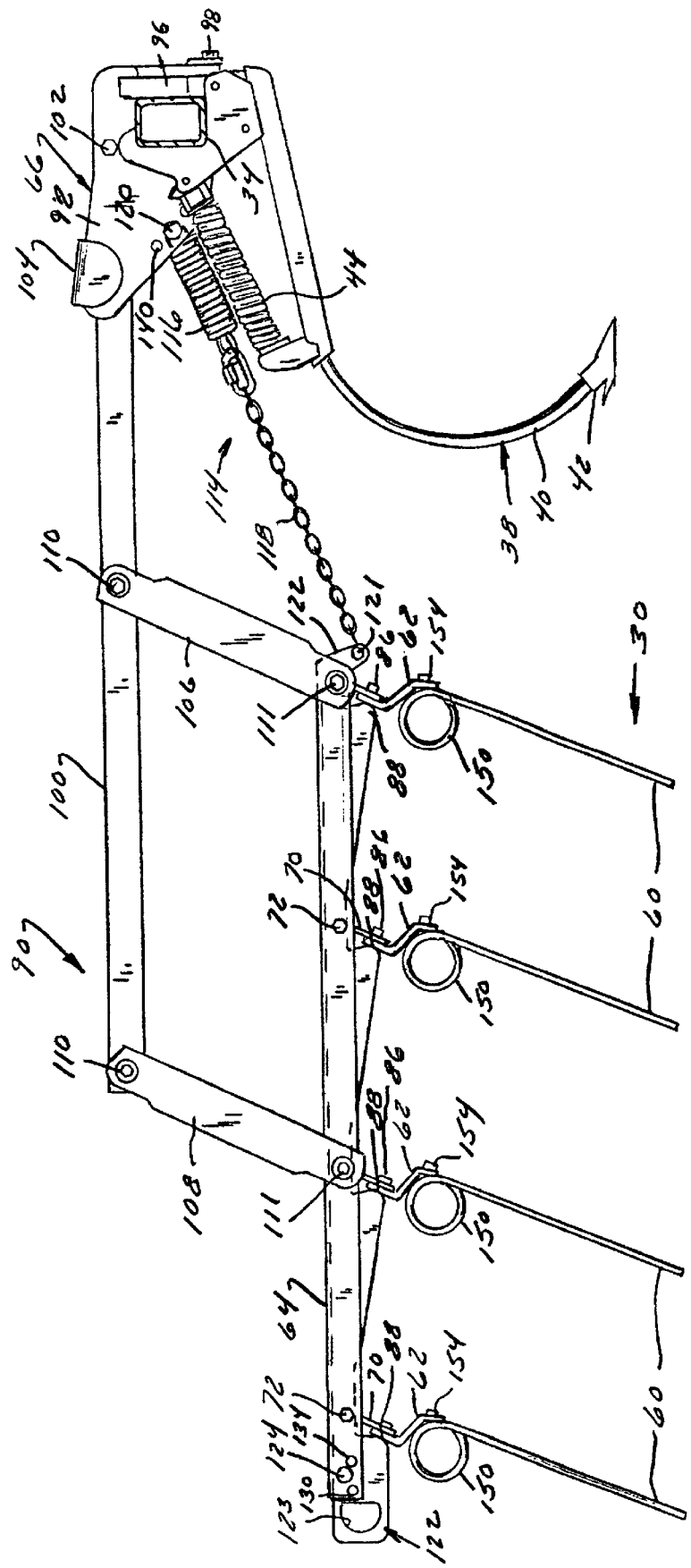
FIG. 3 is a side elevation view of a harrow of the implement of FIG. 1.

The cultivator 22 is conventional. It includes a frame formed from longitudinal tubular beams 32 and transverse tubular beams 34, a hitch 36 that couples the frame to a prime mover, and a plurality of cultivator members in the form of shank assembly 38 or plows that extend downwardly from the transverse beams 34 to the ground. As best seen in FIGS. 2 and 3, each shank assembly 38 includes a curved arm 40 mounted on the associated transverse beam 34 and a sweep 42 mounted on the bottom end of the arm 40. The arms 40 are pivotally mounted on the transverse beams 34 and are biased to the rearward-most positions thereof by springs 44. A plurality of wheels 46 are mounted on arms 48 that are pivotable with respect to the frame. The arms 48 are coupled to a hydraulic cylinder 50 by a suitable linkage 52 that raises and lowers the arms 48 upon cylinder extension and retraction. The wheels 46 therefore can be raised from their illustrated, lowermost position to either 1) a partially raised position to reduce the penetration depth of the shank assembly 38 or 2) a fully raised position for transport.

The shank assembly 38 of successive rows of the illustrated cultivator 22 are indexed relative to the lines of travel of the sweeps of the remaining rows to effect a so-called "split the middle" sweep pattern, which allows for uniform ridges to be formed. The shank assembly 38 ahead of the rear two rows of sweeps take a full cut and leave alternating strips of untilled soil. The shank assembly 38 of the two rear rows till the untilled strips left by the forward sweeps. Specifically, the sweeps in the next to last row till one half of the width of the remaining untilled strips and take out the middle of the ridges left by the sweeps in the row directly in front of that row. The shank assembly 38 of the rear row till the other half of the untilled strips and fill the grooves left by the next to last row of sweeps and take out the middle of the ridge left by the sweeps of the third row, resulting in a groove behind each of the shank assembly 38 of the rear row and a ridge adjacent each groove.

Except for being of different widths, the harrow sections 26, 28, 30 are identical to one another. The following description of harrow section 30 therefore applies equally to sections 26 and 28.

Figure 4:
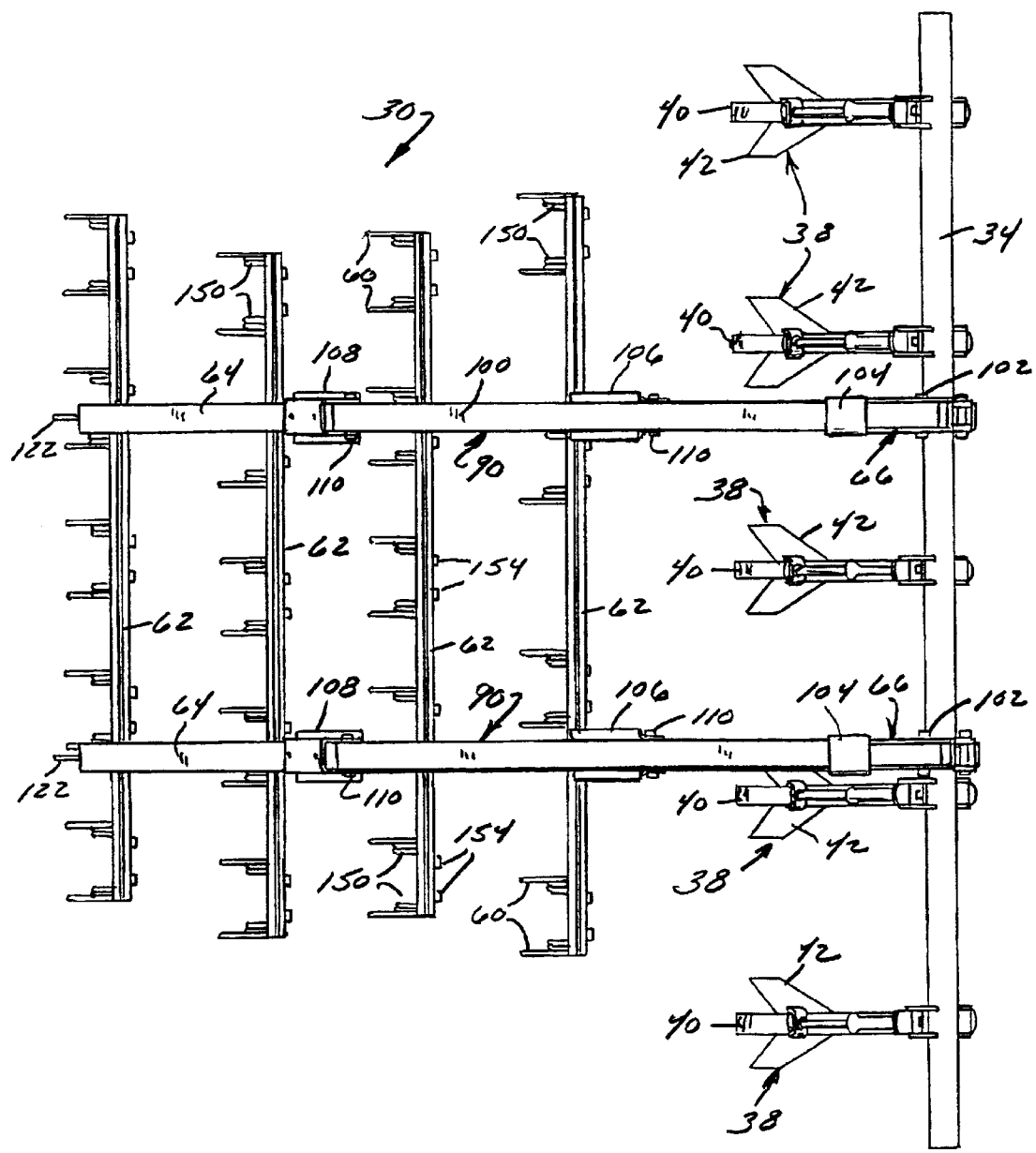
FIG. 4 is a top plan view of a section of the harrow of FIG. 3.

Referring to FIGS. 3–5, harrow section 30 includes at least a plurality of tines 60 and a frame that supports the tines 60. The frame preferably comprises 1) a plurality (4 in the illustrated embodiment) of tine bars 62 that support the tines 60 in longitudinally spaced, transversely extending rows, and 2) a pair of longitudinally extending support arms 64. The frame is coupled to the cultivator by a pair of floating hitch assemblies (discussed in Section 2) below.

Still referring to FIGS. 3–5, each of the support arms 64 extends the full length of the harrow section 30. Each support arm 64 is generally n-shaped when viewed in transverse cross section so as to form a hollow interior that receives a rake angle adjuster slide plate 122 as detailed in Section 3 below.

Referring to FIGS. 6–7, each tine bar 62 is suspended from the associated support arm 64 by a respective hinge 70. The hinge 70 allows for automatic movement of individual rows of tines by permitting the tine bars 62 to pivot forwardly. Each hinge 70 is pivotally suspended from the associated support arm 64 by a hinge pin 72 that extends through opposed holes 74 in the support arm 64 and through a bore 76 in the upper portion of the hinge 70.

The tine bar 62 is generally Z-shaped, having an upper, generally vertical leg 80, a center, generally horizontal leg 82, and a lower, generally vertical leg 84. The upper leg 80 is bolted to mounting holes 78 in the hinges 70 via bolts 86. The lower leg 84 has a plurality of spaced holes for receiving the tines 60. These holes are spaced symmetrically from one another to provide the tine indexing described below. The rear surface of the upper leg 80 normally rests against stops 88 on slide plates 122 (detailed in Section 3 below) to determine the rake angle of the row of tines mounted on the tine bar 62. However, the tine bars 62 are free to pivot forwardly away from the stops 88 to permit forward pivoting movement of each of the tine bars 62 independently of the others upon, e.g., reverse movement of the implement, thereby preventing damage to the tines 60.

Referring now to FIGS. 5 and 6, the tines 60 may comprise any wire or peg-like structures that level the soil as the harrow 24 passes over it. In the illustrated embodiment, the tines 60 are provided as tine assemblies, each of which is formed from a single piece of spring wire. Each tine assembly includes a pair of transversely-spaced, vertically extending tines 60, two coils 150 located at the upper ends of the tines 60, and a transverse portion 152 that connects the coils 150 to one another. The transverse portion 152 also serves as a mount point for mounting each tine assembly on the associated tine bar 62. Specifically, the transverse portion 152 is held in place by a pair of bolts 154 that extend 1) through a bracket 156 located behind the transverse portion 152, 2) beneath the transverse portion 152, and 3) through the indexed and aligned holes in the lower leg 84 of the associated tine bar 62. This arrangement biases the individual tines 60 against the stops 88, but allow the individual tines 60 to resiliently deflect away from the stops 88 upon encountering an obstruction.

The tines 60 are indexed relative to one another and to the line of travel of the last row of shank assembly 38 on the cultivator 22 so as to maximize the leveling capability of the harrow 24. Specifically, the front row of tines 60 is positioned such that they split the middle of the ridges or windrows made by the last row of shank assemblies 38. The second row of tines 60 is indexed to the first row so that each tine 60 of the second row splits the middle of ridges or windrows formed between two adjacent tines of the first row. The tines 60 of the third and fourth rows are also offset relative to the tines of the first and second rows and to each other. In the illustrated embodiment, shank assembly 38 leave a substantial ridge between each pair of grooves on 24" centers. The tines 60 of the first row are indexed relative to the line of travel of the last row of shank assembly 38 to split the middle of these ridges. Only two tines are positioned in each line of travel between lines of travel of the shank assembly 38. The first row leaves smaller uniform ridges on 8" centers. The tines 60 of the second row are offset 4" relative to the tines of the first row and are located on 8" centers so as to split the middle of the ridges left by the first row. The tines 60 of the third row are offset 2" from the tines of the second row and are located on the 4" centers to cut a new path. The fourth row is offset 4" from the third row and is arranged to split the ridges left by the third row.

Figure 8:
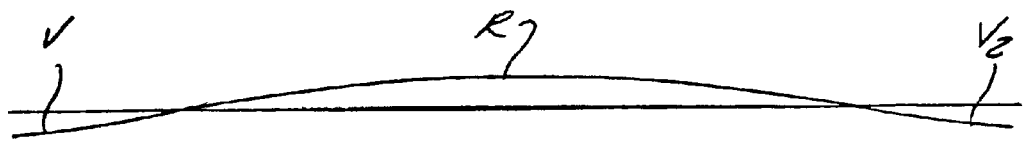
FIGS. 8–10 schematically illustrate the progressive leveling effect achieved during operation of the harrow of FIGS. 1–3.
Figure 9:
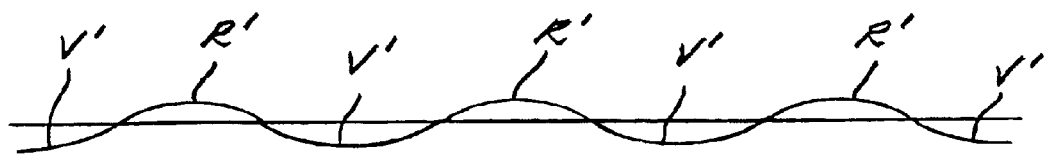
Figure 10:

The leveling effect achieved by the tine 60 is illustrated in FIGS. 8–10, which schematically illustrate the idealized profile of a strip of soil having a ridge left between two adjacent shank assemblies 38 on the last row of the cultivator 22. FIG. 8 illustrates that the ridge R left by the shank assembly 38 is relatively large and deep and is flanked at both ends by similarly shaped valleys V1 and V2. FIG. 9 illustrates that the first and second rows of tines 60, in combination, break the ridge R of FIG. 8 into three much shallower, narrower ridges R' flanked by smaller, narrower valleys V'. FIG. 10 illustrates that the depths and widths of both the ridges R" and valleys V" are reduced still further after passage of the third and fourth rows of tines 60. A comparison of FIG. 8 and FIG. 9 illustrates that the primary leveling is performed by the first two rows of tines. The tines 60 of the third and fourth rows function primarily to break up clods and to firm the soil.

Figure 11:
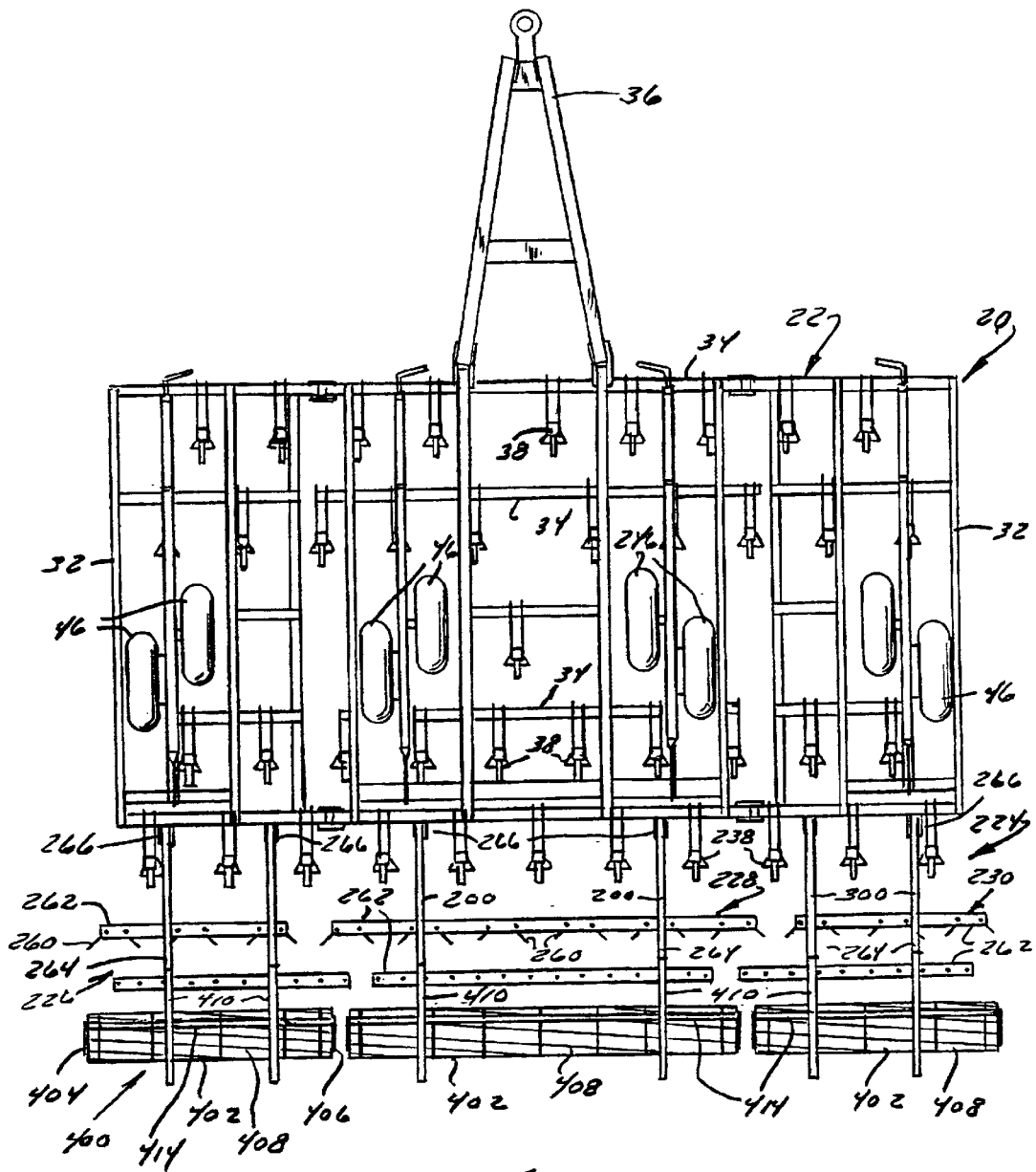
FIG. 11 is a top plan view of a soil working implement constructed in accordance with a second preferred embodiment of the invention.
Figure 12:
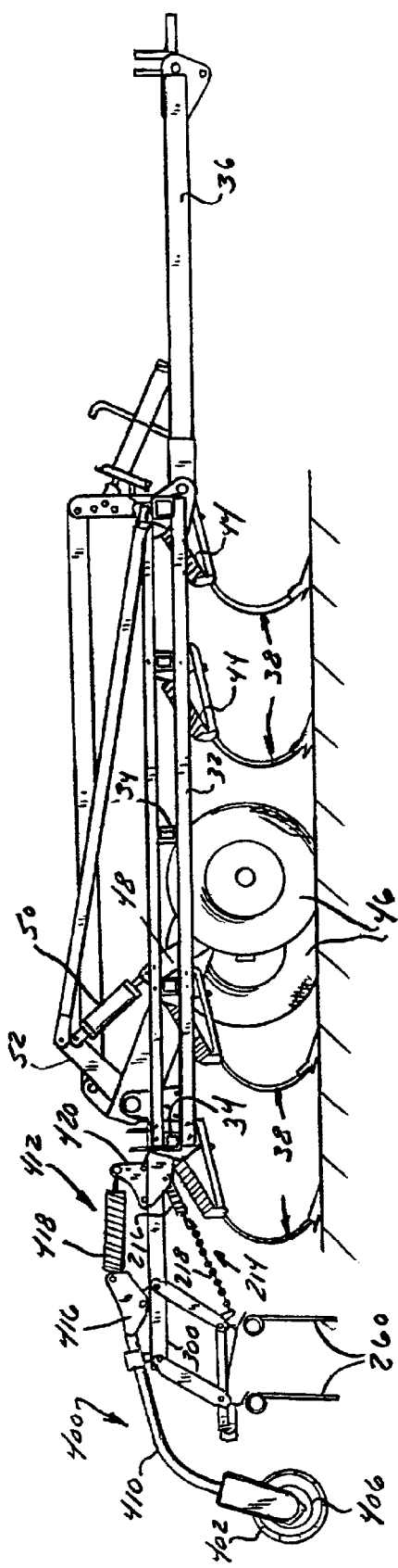
FIG. 12 is a side elevation view of the soil working implement of FIG. 11.

A rotating basket or "rotary firming wheel" could perform the firming and clod reduction functions of the last two rows of tines. Referring now to FIGS. 11 and 12, a harrow 224 is illustrated that is identical to the harrow 24 of the first embodiment except for the fact that the last two rows of tines are replaced with a rotary firming wheel 400 configured to perform the clod reduction and soil firming function. Elements of the harrow 224 corresponding to elements of the harrow 24 are designated by the same reference numerals, incremented by 200. Harrow 224 therefore includes three harrow sections 226, 228, and 230, each of which comprises a plurality of rows of tines 260 mounted on tine bars 262. The tine bars 262 are supported on support arms 264 coupled to the cultivator 22 by a hitch 266.

Still referring to FIGS. 11 and 12, a preferred rotary firming wheel assembly 400 includes a rotating basket 402 mounted on spaced brackets 404, 406. Each basket 402 may be formed from any structure or combination of structures that engage the ground so as to break up clods and firm the soil without unnecessarily compacting the soil.

The basket 402 of each rotary firming wheel assembly 400 is mounted to the associated harrow section 226, 228, 230 via a pair of transversely spaced, longitudinally extending mounting arms 410 and a corresponding pair of coil spring flex systems 412. The lower ends of both mounting arms 410 are connected to a common transverse link 414 that is connected at its ends to the mounting brackets 404, 406. The upper end of each mounting arm 410 is pivotably connected to one end of a plate 416 of the coil spring flex system 412. The plate 416 is generally triangular, being pivotably mounted on an associated tow arm 300 at a central position thereof and having front and rear ends. The upper end of each mounting arm 410 is connected to the rear end of the associated plate 416. A spring 418, connected to the front end of the plate 416 and to a spring support bracket 420 on a tow arm 300, biases the plate 416 and the mounting arm 410 to a position maintaining a firm contact between the crumbler wheel assembly 400 and the ground.

As discussed briefly above, each harrow section is configured to be hitched to the cultivator 22 by a floating hitch arrangement. The floating hitch arrangement permits substantial float of the harrow assembly of that section relative to the cultivator in order to accommodate changes in ground topography. It also maintains a parallel relationship between the harrow assembly and the portion of the harrow that is towed by the cultivator or other towing implement or prime mover. (The harrow assembly of a particular harrow section of the first preferred embodiment comprises the tines 60, the tine bars 62, the support arms 64, and any other structures that move with these structures as a unit). The floating hitch arrangement also is configured to permit each harrow section to pivot relative to the cultivator 22 or other towing implement. The same floating hitch arrangement can be used for both the harrow 24 of the first embodiment and the harrow 24 of the second embodiment. It will therefore be described in conjunction with the first embodiment, it being understood that the discussion applies equally to the second embodiment, and that the hitch arrangement is usable with other types of harrows as well.

While the desired effects could be obtained via a variety of structures, they preferably are obtained via a combination of a floating hitch and a four-bar linkage assembly, preferably a parallelogram linkage assembly 90. Two floating hitches and the associated parallelogram linkage assemblies 90 are preferably provided for each harrow section 26, 28, 30.

Figure 13:
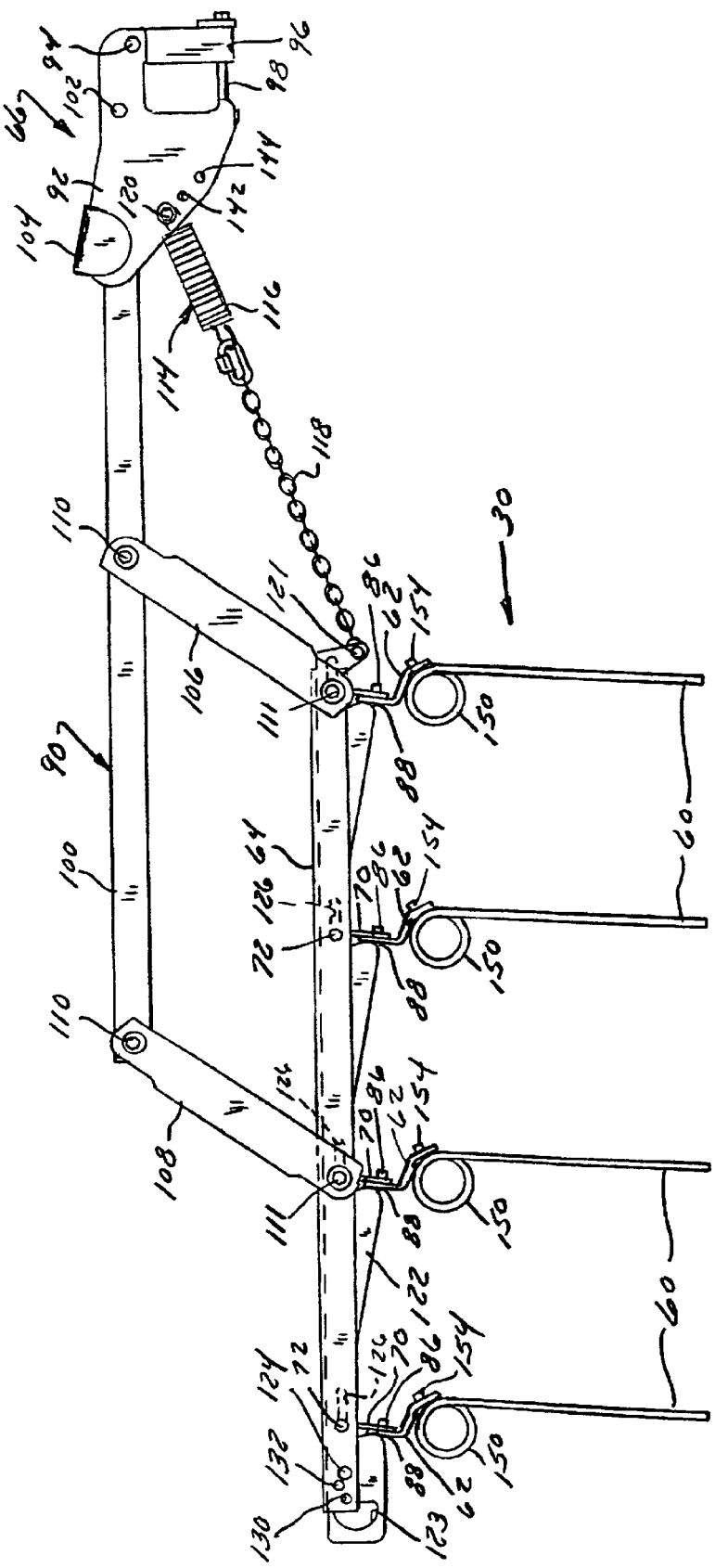
FIG. 13 is a side elevation view of the harrow section of FIGS. 4–6, illustrating a floating hitch mechanism and a rake angle adjust mechanism of the harrow section in first operational positions thereof.
Figure 14:
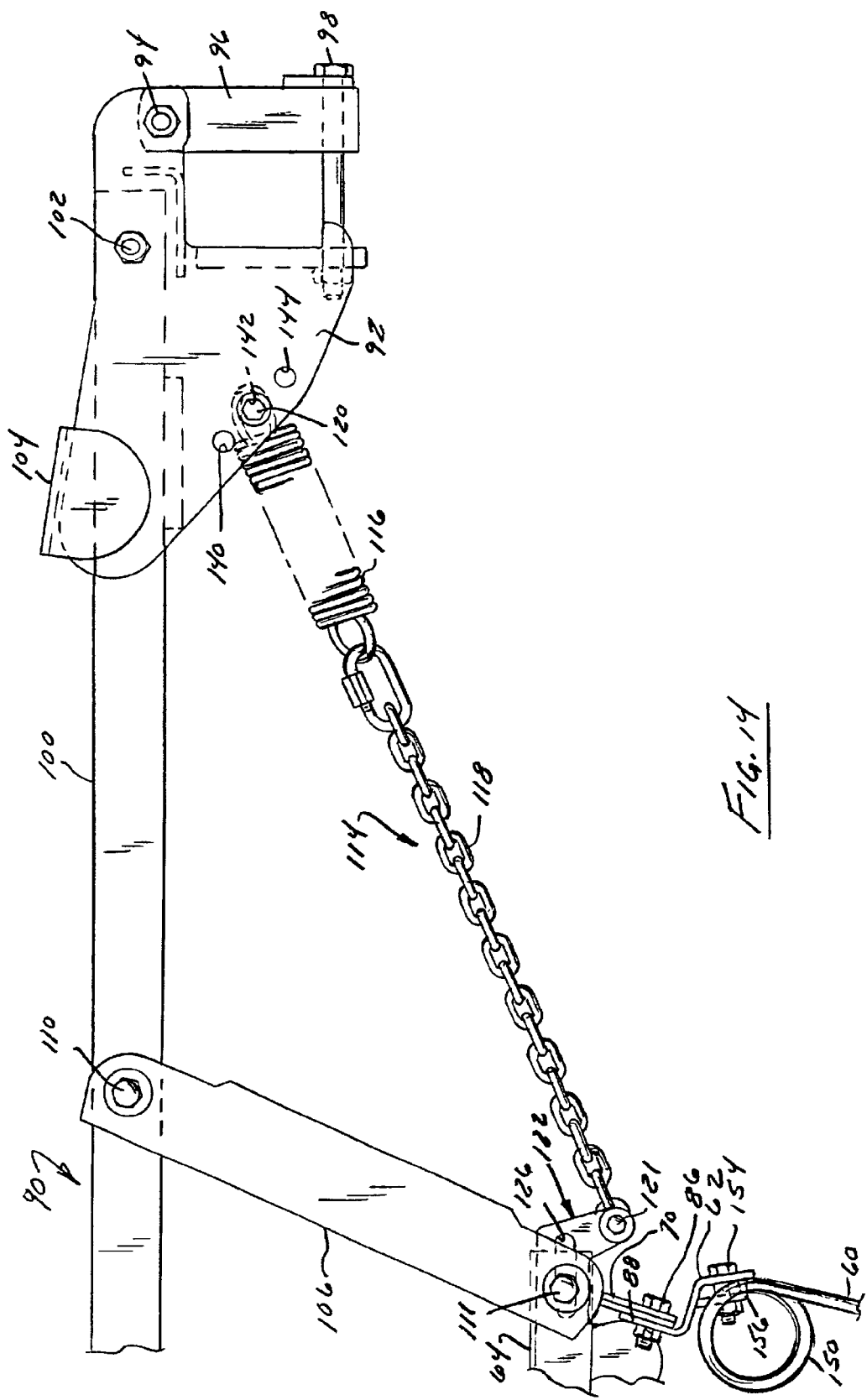
FIG. 14 is a side elevation view of a portion of the harrow section of FIGS. 4–6, illustrating the floating hitch mechanism and the tine rake angle adjust mechanism in second operational positions thereof.

Each floating hitch assembly includes a longitudinally extending tow arm 100 and the hitch 66. The hitch 66 takes the form of a bracket rigidly affixed to the cultivator 22. The tow arm is mounted on the bracket so as to be pivotable about a transversely extending, generally horizontal pivot axis. Referring to FIGS. 5, 13, and 14, each bracket of the preferred embodiment includes a pair of side plates 92 that are connected to one another by pins 94 so as to form a channel there between for receiving the end of the associated tow arm 100. The plates 92 are notched at their front ends to form an opening for receiving the drawbar of the cultivator 22. A clamp arrangement, including a clamp plate 96 and a clamp bolt 98, is movable into position after the opening engages the drawbar to rigidly clamp the hitch 66 to the drawbar.

Figure 15:
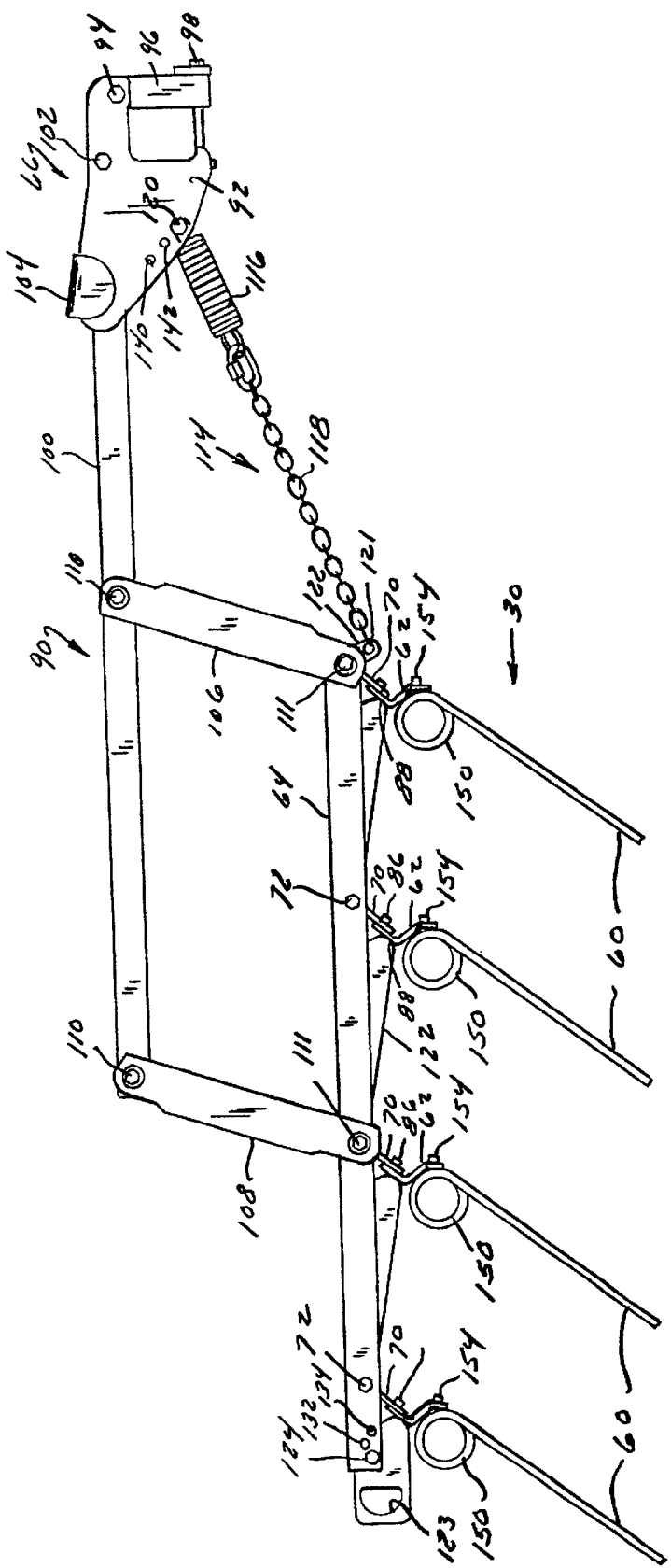
FIG. 15 is a side elevation view of the harrow section of FIGS. 4–6, illustrating the floating hitch mechanism and the tine rake angle adjust mechanism in third operational positions thereof.

Referring to FIG. 15, the tow arm 100 is pivotably connected to the hitch 66 by a pivot pin 102 extending through the side plates 92 and through the front end of the tow arm. Tow arm pivoting is limited by a channel member 104 that is welded or otherwise affixed to the top of the plates 92 so as to form a stop for the upper surface of the tow arm 100. The degree of tow arm pivoting movement or "float" permitted by the hitch 66 can be determined by, e.g., setting a desired inclination of the upper surface of the channel member 102 relative to the horizontal.

The parallelogram linkage assembly 90 couples the tow arm 100 to an underlying support arm 64 of the harrow section 30 so as to permit relative vertical movement between the support arm 64 and the tow arm 100 while retaining a parallel relationship therebetween. Preferably, the tow arm 100 and support arm 64 each form parts of the parallelogram linkage assembly 90, hence requiring only the use of two additional links 106 and 108 to complete the parallelogram linkage assembly. Two such links are provided, one at the front end of the support arm 64, and one at an approximate midpoint of the support arm. Referring to FIG. 5, each link 106 and 108 is generally C-shaped in transverse cross-section, with the center leg of the "C" being cut-out at its upper and lower ends so as permit unobstructed pivoting movement of the links 106, 108, tow arm 100, and support arm 64 relative to one another. The upper cut-outs form clevis mounts for pivotably coupling the upper ends of the links 106, 108 to the tow arm 100 via upper pivot pins 110. The lower cut-outs form clevis mounts for pivotably coupling the lower ends of the links 106, 108 to the support arms 64 via lower pivot pins 111. The pins 111 may double as hinge pins 72 if the holes in the links 106 and 108 properly align with the hinges 70.

Still referring to FIGS. 13–15, each harrow section 26, 28, 30 is biased downwardly against the ground by a pair of tensioner assemblies 114, one of which cooperates with each hitch 66. The tensioner assembly 114 includes a spring 116 that generates the biasing force and a chain 118 that transmits the biasing force of the spring 116 to an associated support arm 64 of the harrow section. The spring 116 is hooked to the chain 118 at its rear end and to a clevis pin 120 at its front end. The chain 118 is hooked to the spring 116 at its front end and to a pin 121 on a slide plate 122 of the rake angle adjust mechanism at its rear end.

The hitch 66 and parallelogram linkage 90, in combination, permit the harrow 24 to follow undulations in ground topography independently of the cultivator 22. In addition, if the harrow section (e.g., section 30) encounters obstructions such as logs or boulders as the implement 20 is traversing the field, the tow arms 100 of that section pivot relative to the hitch 66 to allow the harrow section 30 to move independently of the cultivator 22 while maintaining a parallel relationship between the harrow assembly and the tow arms 90. Variations in tow arm to ground spacing are accommodated by swinging of the tow arms 100 about the links 106 and 108 of the parallelogram linkage assembly 90 (compare FIG. 13 to FIG. 15), thereby maintaining a desired tine penetration depth and negating the need to adjust rake angle or some other aspect of harrow operation every time the operator changes cultivator height. This ability to float also maintains the tine penetration depth despite changes in cultivator penetration depth.

The automatic adjustment provided by the parallelogram linkage assembly 90 permits the tines 60 to continue to penetrate the ground even if the sweep 42 of the shank assembly 38 are raised just above the surface of the ground, as commonly occurs when the operator makes a turn at the end of a row. The harrow 24 therefore levels the tire tracks during a turning operation.

Figure 16:
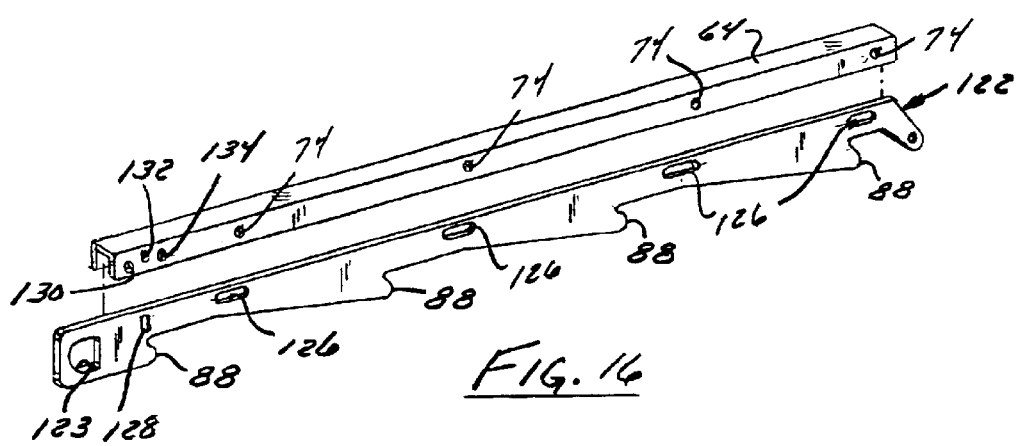
FIG. 16 is an exploded perspective view of the rake angle adjust mechanism.

As discussed briefly above, the rake angle of the tines 60 is determined by the engagement of the tine bars 62 with stops 88. This angle can be adjusted in a simple and convenient manner simply by moving the stops 88 longitudinally of the harrow section, hence varying the distance between the stops 88 and vertical planes containing the hinge pins 72. Conveniently, the rake angles for all rows can be adjusted simultaneously and uniformly through the actuation of a single tine slide on each of the support arms 64. As best seen in FIGS. 6 and 16, each tine slide comprises a unitary steel slide plate 122 extending through the channel formed by the associated n-shaped support arm 64. An access point is provided on the rear end portion of the slide plate 122 to facilitate power or manual actuation of the slide plate 122. In the illustrated embodiment, the access point comprises a handle 123 formed from an opening in a rear end portion of the slide plate 122. The handle 123 protrudes sufficiently beyond the rear end of the support arm 64 to provide manual access to the handle 123, even when the slide plate 122 is in its forward most position. The stops 88 are formed integrally with and extend downwardly from the remainder of the slide plate 122. The slide plate 122 is retained in the support arm 64 by the hinge pins 72 and by a clevis pin 124 located at the rear of the support arm 64. The hinge pins 72 extend through elongated slots 126 in the slide plate 122 so as to prevent vertical movement of the slide plate 122 relative to the support arm 64 while permitting relative longitudinally sliding movement therebetween. The clevis pin 124 extends through a rear hole 128 in the slide plate 122 and a selected one of a plurality (3 in the illustrated embodiment) of corresponding holes 130, 132, and 134 in the support arm 64. Hence, the rake angle of all of the tines 60 on a given harrow section can be adjusted simply by removing the clevis pins of both slide plates 122, grasping the handles 123, and moving each slide plate 122 from a first position in which the hole 128 in the slide plate 122 is aligned with one of the holes 130, 132, or 134 in the support arm 64 to a second position in which the hole is aligned with another hole 130, 132, or 134 in the support arm 64. The clevis pin 124 is then reinserted through the aligned holes to lock the slide plate 122 in its adjusted position.

The connection point of the spring tensioner assembly 114 to at least one of the hitch 66 and the slide plate 122 preferably is adjustable to maintain a constant tension on the harrow assembly despite movement of the slide 122 relative to the hitch 66 during a rake angle adjustment operation. In the illustrated embodiment, this adjustment is made possible by providing several mounting holes 140, 142, 144 on the hitch plates 92 receiving the clevis pin 120 for the spring 116. The number of holes in the hitch plates 92 preferably equals the number of holes in the support arm 64 for receiving the clevis pin 124. In the illustrated embodiment, the clevis pin 120 is placed in the upwardmost hole 140 in the hitch plates 92 when the slide plate 122 is in its forwardmost position as seen in FIG. 13, in the intermediate hole 142 when the slide plate 122 is placed in its central position as seen in FIG. 14, and is in the lowermost hole 144 when the slide plate 122 is in its rearward most position as seen in FIG. 15.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tillage implement having a hitch adapted for connection to a prime mover; a cultivator section attached to said hitch, said cultivator section including a plurality of transversely spaced cultivator members, each cultivator member, when in an operative position, engaged with the soil and forming a furrow therein along a line of travel of the cultivator member; and a tine harrow assembly attached to said cultivator section in trailing relationship thereto, said harrow assembly including a plurality of transversely oriented and spaced tines, the improvement in said tillage implement comprising:

said cultivator section employing the split the middle sweep shank spacing system, the split the middle sweep shank spacing system including a plurality of rows of cultivator members, the plurality of rows of cultivator members including a first row of cultivator members located forward of a second row of cultivator members, the first and second rows of cultivator members located at a rearward end of the cultivator section, the plurality of rows of cultivator members including one or more forward rows of cultivators members located forward of the first and second rows of cultivator members, each cultivator member of the one or more forward rows of cultivator members configured to till a full cut of soil and to leave a plurality of remaining strips of untilled soil therebetween, wherein the first row of cultivator members are located to till a first portion of the plurality of remaining strips of untilled soil, and wherein the second row of cultivator members are located to till a remaining portion of the plurality of remaining strips of untilled soil, wherein the second row of cultivator members includes a first cultivator member and a second cultivator member that is adjacent closest to the first cultivator member, wherein the first cultivator member generates a first furrow alone the line of travel of the first cultivator member, wherein the second cultivator member generates a second furrow along the line of travel of the second cultivator member, and wherein the first and second cultivator members generate an adjoining mound of soil between the first and second furrows; and said plurality of transversely oriented and spaced tines including a first row of tines adjacent closest to said cultivator section, said first row of tines including a first tine and a second tine that is closest adjacent to the first tine, the first and second tines generally located offset relative to said first and second cultivator members such that the first and second tines engage the adjoining mound of soil, wherein the first tine-disperses a first portion of the adjoining mound into the first furrow, and the second tine disperses a second portion of the adjoining mound in the second furrow so as to better level the soil behind the implement.

2. The tillage implement of claim 1 wherein said first row of tines has only two tines positioned along a line of travel between adjacent lines of travel of said first and second cultivators members.

3. The tillage implement of claim 2 wherein said tine harrow assembly includes four transversely oriented rows of tines, the third row of tines having tines mounted thereon at positions laterally offset from the tines of said second row of tines to even better level the soil between the tines.

4. The tillage implement of claim 3 wherein the tines mounted on said third rows of tines are offset laterally from the tines of both said first and second rows of tines.

5. The tillage implement of claim 4 wherein the fourth row of tines are offset laterally from the tines of said third row of tines.

6. The tillage implement of claim 5 further comprising a rotary reel positioned rearwardly of said tine harrow assembly in trailing relationship.

7. A tillage implement comprising:

a hitch adapted for connection to a prime mover;

a cultivator section attached to said hitch; said cultivator section employing the split the middle sweep shank spacing system, the split the middle sweep shank spacing system including a plurality of rows of cultivator members, the plurality of rows of cultivator members including a first row of cultivator members located forward of a second row of cultivator members, the first and second rows of cultivator members located at a rearward end of the cultivator section, the plurality of rows of cultivator members including one or more forward rows of cultivators members located forward of the first and second rows of cultivator, each cultivator member of the one or more forward rows of cultivator members configured to till a full cut of soil and to leave a plurality of remaining strips of untilled soil therebetween, wherein the first row of cultivator members are located to till a first portion of the plurality of remaining strips of untilled soil, and wherein the second row of cultivator members are located to till a remaining portion of the plurality of remaining strips of untilled soil, wherein the second row of cultivator members includes a first cultivator member and a second cultivator member that is adjacent closest to the first cultivator member, wherein the first cultivator member generates a first furrow along the line of travel of the first cultivator member, wherein the second cultivator member generates a second furrow alone the line of travel of the second cultivator member, and wherein the first and second cultivator members generate an adjoining mound of soil between the first and second furrows;

a tine harrow assembly attached to said cultivator section in a trailing relationship thereto; said tine harrow assembly including a plurality of transversely oriented and spaced tines wherein said plurality of transversely oriented and spaced tines includes a first row of tines adjacent closest to said cultivator section, said first row of tines including a first tine and a second tine, the first and second tines being offset relative to each other and said first and second cultivator members such that the first tine disperses a first portion of the adjoining mound of soil into the first furrow and the second tine disperses a second portion of the adjoining mound of soil soil into said second furrow so as to better level the soil behind the implement.

8. The tillage implement of claim 7 wherein said harrow assembly includes a second row of tines trailing said first row of tines at positions that are offset laterally from said tines of said first row of tines such that the soil between the tines of the first row of tines is further leveled.

9. The tillage implement of claim 8 wherein said first row of tines has only two tines positioned along a line of travel between adjacent lines of travel of said first and second cultivators members, and said tine harrow assembly includes four transversely oriented rows of tines, the third row of tines having tines mounted at positions laterally offset from the tines of both said first and second row of tines, the fourth row of tines mounted at positions laterally offset from the tines of said third row of tines, the tines mounted on said third row of tines being offset laterally from the tines of both said first and second rows of tines.

10. The tillage implement of claim 9 wherein a fourth row of tines are offset laterally from the tines of said third row of tines.

11. The tillage implement of claim 10 further comprising a rotary reel positioned rearwardly of said tine harrow assembly in a trailing relationship thereto.

12. A method of tilling soil with a tillage implement having a cultivator section and a trailing tine harrow assembly, said cultivator section employing the split the middle sweep shank spacing system, the split the middle sweep shank spacing system including a first row of cultivator members and a second row of cultivator members located at a rearward end of the cultivator section, the first row of cultivator members located forward of the second row of the cultivator members, the split the middle sweep shank spacing system further including one or more forward rows of cultivator members located forward of the first and second rows of cultivator members, wherein the second row of cultivator members includes a first cultivator member and a second cultivator member that is adjacent closest to the first cultivator member, said tine harrow assembly including a plurality of tines arranged in at least two transversely extending rows of tines, comprising the steps of:

passing said cultivator section through the soil;

tilling a full cut of soil with each cultivator member of the one or more forward rows of cultivator members in such a manner as to leave a plurality of remaining strips of untilled soil between each cultivator member;

tilling a first portion of the plurality of remaining strips of until led soil with the first row of cultivator members;

tilling a remaining portion of the plurality of remaining strips of untilled soil with the second row of cultivator members, wherein the first cultivator member generates a first furrow along the line of travel of the first cultivator member, wherein the second cultivator member generates a second furrow along the line of travel of the second cultivator member, and wherein the first and second cultivator members generate an adjoining mound of soil between the first and second furrows, and engaging said adjoining mound of soil created by said first and second cultivator members with a first tine and a second tine located closest adjacent to said first tine, the first and second tines located alone a first transverse row of said tines that is closest adjacent to said cultivator section, the first and second tines oriented along a line of travel of the adjoining mound between the first and second furrow, wherein the step of engaging includes dispersing a first portion of the adjoining mound of soil laterally into the first furrow with the first tine and dispersing a second portion of the adjoining mound of soil into the second furrow with the second tine so as to better level the soil behind the implement.

* * * * *